(12) United States Patent
Chen et al.

(10) Patent No.: US 7,729,922 B2
(45) Date of Patent: Jun. 1, 2010

(54) DYNAMIC INTERFACE BETWEEN BPSS CONVERSATION MANAGEMENT AND LOCAL BUSINESS MANAGEMENT

(75) Inventors: Qiming Chen, Sunnyvale, CA (US); Meichun Hsu, Los Altos, CA (US); Vinkesh O. Mehta, Austin, TX (US)

(73) Assignee: Open Invention Network, LLC, Durham, NC (US)

( * ) Notice: Subject to any disclaimer, the term of this patent is extended or adjusted under 35 U.S.C. 154(b) by 1434 days.

(21) Appl. No.: 10/222,008

(22) Filed: Aug. 15, 2002

(65) Prior Publication Data

US 2004/0034540 A1 Feb. 19, 2004

(51) Int. Cl.
*G06Q 10/00* (2006.01)
*G06F 13/00* (2006.01)
(52) U.S. Cl. .................... 705/1.1; 719/313; 719/314
(58) Field of Classification Search .............. 705/1, 705/26, 1.1; 719/313, 314
See application file for complete search history.

(56) References Cited

U.S. PATENT DOCUMENTS

| 5,005,200 | A | 4/1991 | Fischer |
| 5,157,726 | A | 10/1992 | Merkle et al. |
| 5,159,630 | A | 10/1992 | Tseng et al. |
| 5,224,166 | A | 6/1993 | Hartman, Jr. |
| 5,311,438 | A | 5/1994 | Sellers et al. |
| 5,557,798 | A | 9/1996 | Skeen et al. |
| 5,790,677 | A | 8/1998 | Fox et al. |
| 5,812,669 | A | 9/1998 | Jenkins et al. |
| 5,941,945 | A | 8/1999 | Aditham et al. |
| 6,049,785 | A | 4/2000 | Gifford |
| 6,072,942 | A | 6/2000 | Stockwell et al. |
| 6,115,744 | A | 9/2000 | Robins et al. |
| 6,125,391 | A | 9/2000 | Meltzer et al. |
| 6,148,290 | A | 11/2000 | Dan et al. |
| 6,269,380 | B1 | 7/2001 | Terry et al. |
| 6,389,533 | B1 | 5/2002 | Davis et al. |
| 6,393,442 | B1 | 5/2002 | Cromarty et al. |
| 6,425,119 | B1 | 7/2002 | Jones et al. |
| 6,434,628 | B1 | 8/2002 | Bowman-Amuah |
| 6,463,460 | B1 | 10/2002 | Simonoff |
| 6,538,673 | B1 | 3/2003 | Maslov |
| 6,636,889 | B1 | 10/2003 | Estrada et al. |
| 2002/0194181 | A1 | 12/2002 | Wachtel |
| 2003/0046583 | A1 | 3/2003 | Goldman et al. |

FOREIGN PATENT DOCUMENTS

WO WO 01/33369 A1 5/2001

OTHER PUBLICATIONS

Information on CommerceOne, Inc. 1999-2001.*

(Continued)

*Primary Examiner*—Naresh Vig
(74) *Attorney, Agent, or Firm*—Ernest J. Beffel, Jr.; Haynes Beffel & Wolfeld LLP (57) ABSTRACT

The present invention relates to devices and methods that coordinate an external conversation process between entities with an internal workflow of one of the entities. More particularly, it relates to devices and methods that are compliant with an inter-enterprise conversation process standard for routing electronic commerce documents between enterprises. Particular aspects of the present invention are described in the claims, specification and drawings.

10 Claims, 8 Drawing Sheets

OTHER PUBLICATIONS

Naick, Berkhoff, Bosnich, Business-to-Business Integration Using MQSeries and MQSI , Dec. 2000, IBM Corporation.*

Duane Nickull, ebXML Technical Architecture, www.xmlglobal.com.*

CommerceOne and NEON Deliver XML-Based ERP Connector For Buysite 6.0; Commerce One to Market and Sell Joint Solution, www.prnewswire.com, Feb. 22, 2000.*

Salz, R., O'Reilly, XML.COM: Examining WSDL, May 15, 2002, available at http://www.xml.com/pub/a/2002/05/15/ends.html, 5 pgs.

Open Applications Group White Paper Document No. 20010301, Best Practices and XML Content for eBusiness and Application Integration, OAGIS Extensions Release 1.1, 2001,pp. 1-34.

Vordel Web Services Security: Knowledgebase, http://www.vordel.com/Knowledgebase/vordel_view1.html, printed 9/112002, 2 pages.

Jones, Information Security article, Jan. 2002, Authorization / EAM Ain't Easy, http://www.infosecuritymag.com/2002jan/features_eam.shtml, 12 pages.

WebServices Framework & Assertion Exchange Using SAML, 5 pages, http://www.w3.org/2001/03/WSWS-popa/paper23/, printed Sep. 11, 2002.

Glushko article: Advanced Technology Program Close Out Performance Report: Project Title: Component-Based Commerce: The Interoperable Future, Apr. 14, 2000, 8 pages, Publication Status Unclear.

Glushko article: ATP Close Out Performance Report: Component-Based Commerce: The Interoperable Future, 9th Revision, modified Jan. 31, 2000, 57 pages, Publication Status Unclear.

Editors: Dan Brickley and R.V. Guha, Resource Description Framework (RDF) Schema Specification, W3C Proposed Recommendation Mar. 3, 1999, W3C XP-002203858, available at http://www.w3.org/TR/1999/PR-rdf-schema-19990303, 1-29.

Editors: David Beech et al., "XML Schema Part 1: Structures", W3C Working Draft May 6, 1999, W3C XP-002203859, available at http://www.w3.org/1999/05/06-xmlschema-1, 1-53.

Editors: Paul V. Biron and Ashok Malhotra, "XML Schema Part 2: Datatypes", World Wide Web Consortium Working Draft May 6, 1999, W3C XP-002203860, available at http://www.w3.org/1999/05/06-xmlschema-2, 1-28.

Kent Brown, "Biztalk: Fluent in E-Business", XP-002203861, 1-6, Dec. 1999.

W. Yeong, T. Howes, S. Kille, "Lightweight Directory Access Protocol", ISODE Consortium, Mar. 1995, pp. 1-19.

R. Moats, "URN Syntax", AT&T, May 1997, pp. 1-7.

Nils Klarlund, Anders Moller, Michael I. Schwartzbach, "Document Structure Description 1.0", AT&T and BRICS 1999, XP-002203865, pp. 1-34.

K. Narayanaswamy, K.V. Bapa Rao, "An Incremental Mechanism for Schema Evolution in Engineering Domains", IEEE 1988, pp. 294-300.

Editors: Tim Bray, Jean Paoli, C.M. Sperberg-McQueen, "Extensible Markup Language (XML) 1.0", World Wide Web Consortium Dec. 8, 1997, W3C XP-002203864, available at http://www.w3.org/TR/PR-xml-971208, 1-32.

A Davidson, M. Fuchs, M. Hedlin, M. Jain, J. Koistinen, C. Lloyd, M. Maloney, K. Schwarzhof, Schema for Object-Oriented XML 2.0, W3C Note Jul. 30, 1999, W3C XP-002203857, available at http://www.w3/org/1999/07/NOTE-SOX-19990730, 1-22.

Schneier, Bruce, Applied Cryptography 1966, John Wiley and Sons, Inc., pp. 40-41.

Cover Pages: Web Services Description Language (WSDL), Technology Reports, 31 pages, Jul. 9, 2002, located at http://xml.coverpages.org/wsdl.html.

White Paper , "Plug and Play Business Software Integration The Compelling Value of the Open Applications Group" Open Applications Group Copyright 2000, pp. 1-15.

Qiming Chen, Meichun Hsu, Vinkesh Metha, "How public conversation management integrated with local business process management," pp. 111-126, Information Systems and E-Business Management. vol. 2. No. 1. Apr. 2004.

Qiming Chen, Meichun Hsu, Vinkesh Mehta. "How Public Conversation Management Integrated with Local Business Process Management," cec, p. 199, 2003 IEEE International Conference on E-Commerce Technology (CEC '03), 2003.

Qiming Chen, Meichun Hsu. "Inter-Enterprise Collaborative Business Process Management," icde, p. 0253, 17th International Conference on Data Engineering (ICDE '01), 2001.

Sayal M et al., Institute of Electrical and Electroics Engineers: "Integrating Workflow Management Systems with Business-to-Business Interaction Standards" Proceedings 18th International Conference on Data Engineering. (ICDE '2002). San Jose, CA Feb. 26-Mar. 1, 2002, International Conference on Data Engineering. (ICDE), Los Alamitos, CA: IEEE Comp. Soc, US vol. Conf. 18, Feb. 26, 2002, pp. 287-296.

Jianxun Liu et al., "An Inter-Enterprise Workflow Management System for B2B E-Commerce and Supply Chain: A Case Study" 2001 IEEE International Conference on Systems Man and Cybernetics. SMC 2001. Tucson, AZ. Oct. 7-10, 2001. IEEE International Conference on Systems, Man and Cybernetics, New York, NY; IEEE, US vol. vol. 1 of 5, Oct. 7, 2001, pp. 292102926.

Bhaskaran K et al: "An E-Business Integration and Collaboration Platform for B2B E-Commerce" Advanced Issues of E-Commerce and Web-Based Information Systems, WECWIS 2001, Third International Workshop on Jun. 21-22, 2001, Piscataway, NJ, USA, IEEE, Jun. 21, 2001, pp. 120-122.

European Search Report dated Feb. 6, 2008 relating to EP Serial No. 03788384.0-1238.

* cited by examiner

DYNAMIC INTERFACE BETWEEN BPSS CONVERSATION MANAGEMENT AND LOCAL BUSINESS MANAGEMENT

BACKGROUND OF THE INVENTION

The present invention relates to devices and methods that coordinate an external conversation process between entities with an internal workflow of one of the entities. More particularly, it relates to devices and methods that are compliant with an inter-enterprise conversation process standard for routing electronic commerce documents between enterprises.

Figure 1:
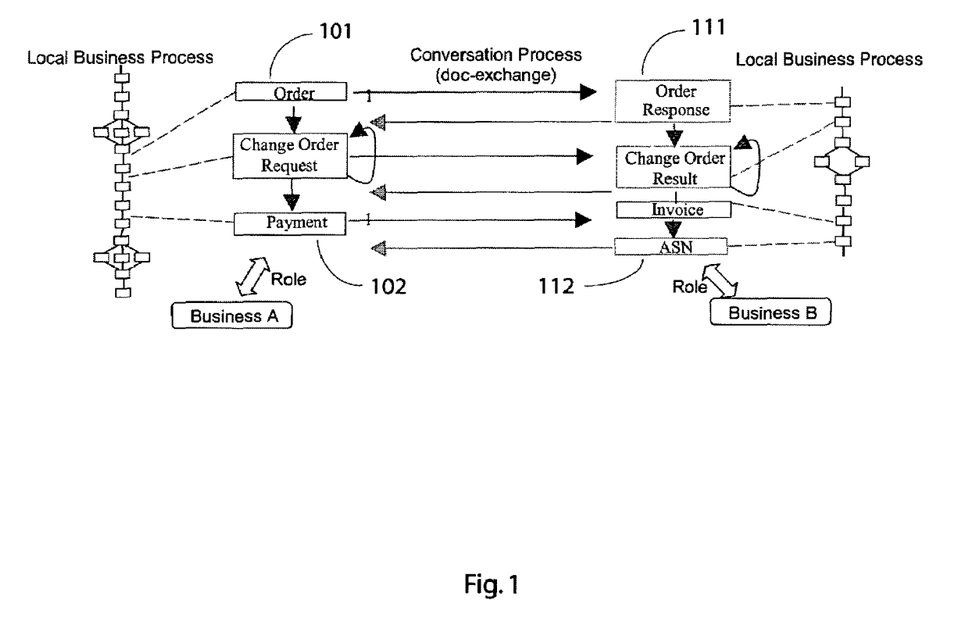
FIG. 1 depicts interaction between two businesses each having its own local business process system.

E-business is moving toward a paradigm in which enterprises interact with each other through exchanging XML documents based on well-defined protocols such as SOAP, WSDL, ebXML, which enables them to interoperate their Web services in a dynamic and loosely coupled way [T. Bray, J. Paoli, C. M. Sperberg-McQueen, "Extensible Markup Language (XML) 1.0 Specification", February 1998, (http://www.w3.org/TR/REC-xml), EbXML.org, Business Process Specification Schema", V1.01, 2001, SOAP, "Simple Object Access Protocol", http://msdn.Microsoft.com/xml/general/soapspec.asp, www.w3c.org, WSDL, "Web Service Description Language", www.w3c.org.]. In order for enterprises to collaborate at the business-process level, channels must be developed to allow the business processes that run on their local sites to interact. Several Inter-enterprise Conversation Process (ICP) specification standards have been proposed such as ebXML BPSS (Business Process Specification Schema) [EbXML.org, Business Process Specification Schema", V1.01, 2001], WSCI (Web Service Choreography Interface) [WSCI, "Web Service Choreography Interface", Tech Report by Italio, SAP, BEA, Sun Microsystems. 2002], WSCL (Web Service Conversation Language) [WSCL, "Web Service Conversation Language", HP Submission to W3C, www.w3c.org]. As shown in FIG. 1, an ICP specifies the choreography of document exchange as an abstract interface, leaving the processing and provisioning of documents to local business processes or services. In this illustration, two parties are represented by two columns of business documents. Transmission of an order 101 lends to an invoice 111. The invoice eventually prompts a payment 102, after which merchandise is shipped and a shipping notice 112 is generated. As illustrated in the figure, the two parties have internal processes that communicate through a conversation process. As an abstract interface, one ICP can be supported by a variety of business processes and services with different implementations. However, none of the ICPs specify how local business processes couple their internal and external processes.

Accordingly, an opportunity arises to develop methods and devices that coordinate between an external ICP and an internal workflow.

SUMMARY OF THE INVENTION

The present invention relates to devices and methods that coordinate an external conversation process between entities with an internal workflow of one of the entities. More particularly, it relates to devices and methods that are compliant with an inter-enterprise conversation process standard for routing electronic commerce documents between enterprises. Particular aspects of the present invention are described in the claims, specification and drawings.

DETAILED DESCRIPTION

The following detailed description is made with reference to the figures. Preferred embodiments are described to illustrate the present invention, not to limit its scope, which is defined by the claims. Those of ordinary skill in the art will recognize a variety of equivalent variations on the description that follows.

An ICP (or simply a conversation process) is not executed on a centralized server, but carried out by multiple participating parties. Each party is responsible for enforcing its peerview of the conversation process. This typically includes verifying the inbound documents and controlling the sending of outbound documents according to the ICP specification.

At one business site, a conversation process that handles document exchanges is coupled with a local business process handling a workflow of tasks for document processing and provisioning. In turn, these tasks are actually performed by the concrete actions, services and other local business processes.

Figure 2:
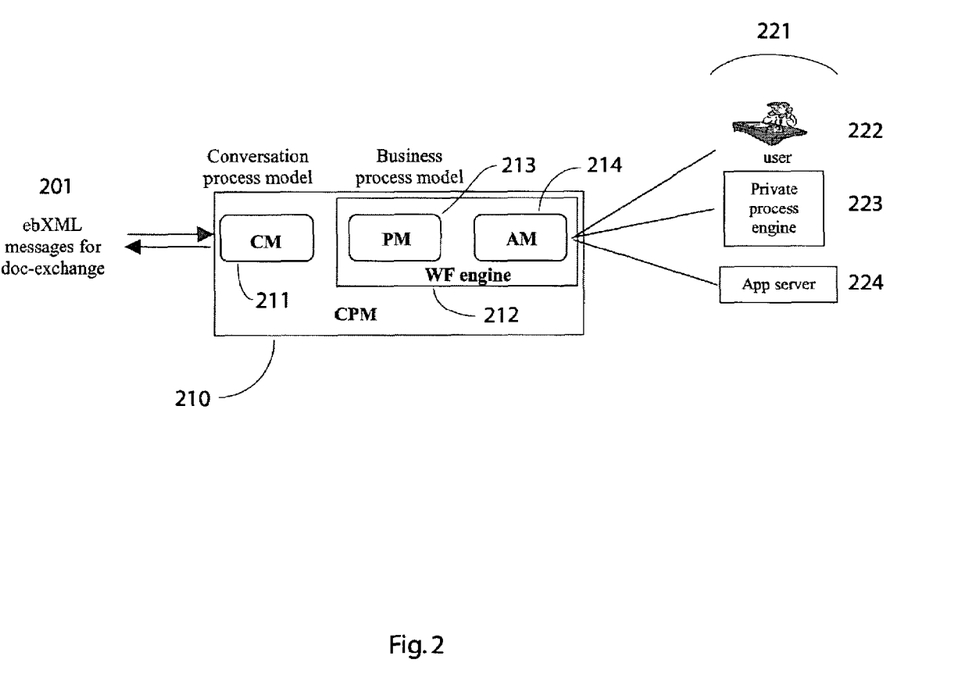
FIG. 2 depicts a conversation process manager including a conversation manager and a workflow engine.

There is or should be independence between "conversation activities" and "process tasks", and between tasks and actions. For an external conversation process between entities, the conversation activities typically are interface level objects internal to the conversation process, and tasks for supporting the conversation activities typically are implementation level objects defined externally to the conversation process. For a business process, managed by an entity, the tasks typically are interface level objects internal to the business process, and actions for performing the tasks typically are implementation level objects defined externally to the business process. This implies that a so-called Collaborative Process Manager (CPM) for supporting inter-enterprise collaboration is potentially made of three communicating components, as illustrated in FIG. 2. The components handle conversations 211, local business processes 213 and actions 214, respectively. The so-called Conversation Manager (CM) 211 handles inter-enterprise business interaction 201 based on an ICP model (conversation model). A core function of CM is to enforce the choreography of document exchange. The so-called Process Manager (PM) 213 runs local processes based on a business process model. A core function of PM is to enforce the rules for triggering tasks. These tasks contribute to the accomplishment of the local process, including document manipulation as required by the conversation activities. The Action Manager (AM) 214 dispatches and invokes local applications, services or processes to perform process tasks. An action provides an actual implementation of document processing, provisioning or other applications. Actions may be called through local or remote invocation, based on CORBA, WSDL, etc. The invocation may be made synchronous or asynchronous. The PM and AM can both be implemented as parts of a workflow engine 212. On the internal side of interactions 221, the CPM 210 may interact with users 222, private process engines 223 or application servers 224. The functions of conversation management, process management and action management may be combined in a CPM system 210, or provided by separate but communicating systems.

In this document, CPM is a general name rather than any specific system. By conversation process, we mean the one describing conversation flow; by business process we mean the one describing workflow. For clarity, we distinguish the basic operations of conversation processes and business processes by calling them conversation activities and tasks respectively.

In supporting business collaboration, CM focuses on enforcing the constraints of inter-enterprise document flow; PM focuses on enforcing the constraints of intra-enterprise task scheduling. CM deals with choreographed document exchange; PM deals with document processing and provisioning accordingly, as well as the issues on transaction, recovery, concurrency, etc, in the context of process management.

At a business site, a conversation process, say C, defining the choreography of document exchange, actually indicates the expected behavior of the coupling business process, say, P, for processing and producing the corresponding documents. If P can process and provide documents in the order that matches the order of document receiving and sending specified in C, we say P can be used support C.

In general, the conversation process and the coupling business process are based on different models. A conversation activity has two operations for delivering requesting and responding documents, which may map to one or more local tasks for consuming and producing the documents. The ICP models for conversation process standards such as BPSS [EbXML.org, "Business Process Specification Schema", V1.01, 2001], WSCI [WSCI, "Web Service Choreography Interface", Tech Report by Italio, SAP, BEA, Sun Microsystems. 2002], etc., are all different from the traditional workflow models such as WFMC's reference model [Workflow Management Coalition, www.aiim.org/wfmc/mainframe.htm]. The choreography of conversation activities and the flow of task execution are also semantically different. Since in business interactions, a system operated by one party cannot control the behavior of systems operated by other parties, the choreography of interactions should be verified with respect to a commonly agreed conversation model. In present circumstances, with a variety of emerging standards, a conversation process standard selected by parties to a conversation may be supplemented by an express conversation process agreement between the parties, either bilateral or as participants in a group.

In the following section we shall discuss two major issues: the conversation management and the dynamic interface between conversation management and local business process management based on the conversation model-driven asynchronous task activation mechanism.

Conversation Manager for Supporting Inter-Enterprise Collaboration

We have developed a CM system that we call BPSS collaborator, for handling choreographed conversation under the ebXML Business Process Specification Schema (BPSS) standard [EbXML.org, Business Process Specification Schema", V1.01, 2001]. One of skill in the art will recognize that the following description also applies or can be extended to ICPs other than BPSS, such as WSCI or WSCL, or any emerging or later-developed ICP standard.

BPSS

The ebXML BPSS is a standard XML-based language for specifying inter-enterprise conversation processes. In BPSS, a conversation process is called collaboration. A binary collaboration has two authorized-roles and a multi-party collaboration has more than two partner-roles. The business partners participating in a collaboration process play these roles; they interact through a set of choreographed conversation activities (called business activities in BPSS). A conversation activity may represent a business transaction consisting of one or two predefined business document flows between the participating roles. Iteratively, a conversation activity may also represent a nested binary collaboration. In general, the BPSS model is a conversation process model; it provides the abstract interfaces of business interaction, regardless of the concrete implementation.

Different from the usual business process or workflow specifications, a BPSS only describes the public interface between business partners, which is essentially the document exchange between them. Different from the tasks in a business process, a conversation activity in a conversation process usually represents two operations: a request and a response between the two participating roles. Moreover, different from the flat business process models, the BPSS model is hierarchically structured.

BPSS Collaborator—a CM Based on BPSS Model

Figure 3:
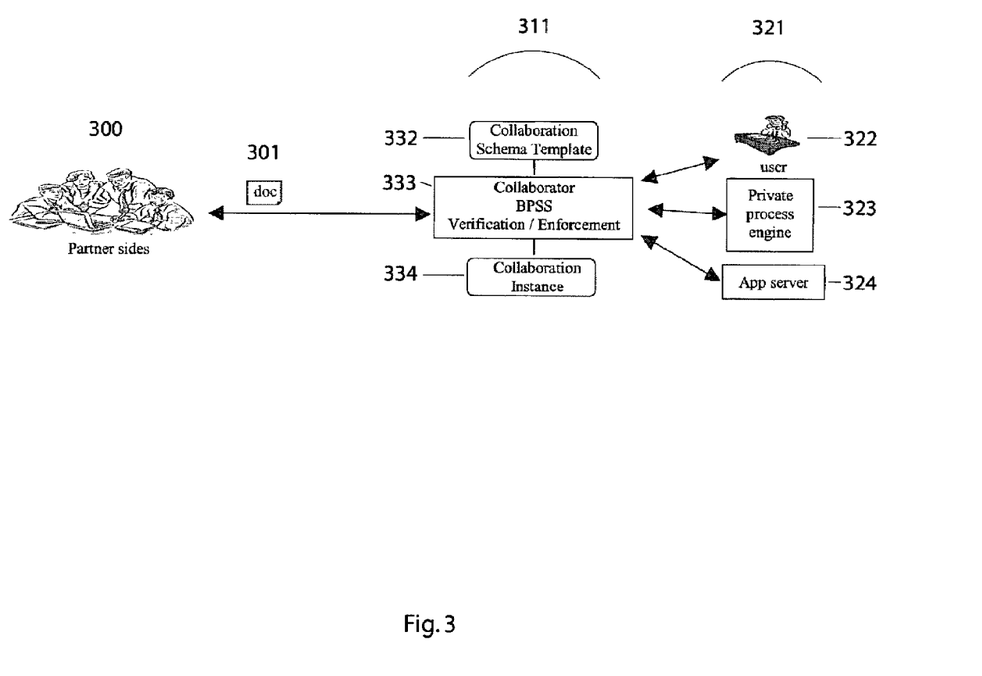
FIG. 3 illustrates the BPSS collaborator in a conversation management system.

The BPSS collaborator in FIG. 3 is a CM system 311 that we developed for handling BPSS based, peer-to-peer binary or multi-party collaboration. At a business site that participates in an inter-enterprise collaboration, the primary function of the BPSS collaborator 333 is to enforce the "interaction-flow" constraints 332 with its partners 300, based on the BPSS conversation process model. A particular conversation is a collaboration instance 334. The concrete implementation of document manipulation is left to local workflow systems and services 321.

A collaboration specified in BPSS includes multiple choreographed conversation activities having a history, rather than a single round of document exchange. Thus, the BPSS collaborator 333 handles conversation activities in the way analogous to workflow system handling process tasks. Enforcing the choreography of conversation activities at a business site preferably takes into account not only the existence of inbound and outbound documents, but also the order and time for those documents to be sent or to be received (i.e., the history of the collaboration instance). This function is not covered by conventional workflow systems. Further, since inter-enterprise collaboration is not controlled by a single enterprise, and the behavior of other enterprises may not be trusted by default. The choreography of document exchanges preferably is validated by the collaborator 333 taking into account both the schema or interaction constraints 332 and the history of the particular interaction 334.

Given the above requirements, the BPSS collaborator provides the following functions. It supports the BPSS definition model, including the creation, maintenance and manipulation of conversation process template objects in Java or another programming language. These objects are created by parsing the XML specifications into DOM trees or other tree structures and then by turning the trees into the corresponding Java objects. It supports the BPSS instance model at runtime, including creating, maintaining and evolving local-site collaboration instances step by step along with the business interactions. It verifies the choreography of conversation activities (conversation-flow) based on the template model 332 and the execution history of each collaboration instance 334. These are core functions for enforcing the document exchanges constraints in multi-party or binary collaborations; for checking the consistency of document exchange with respect to the collaboration context, document types, participating roles, etc; for evolving conversation process instances consistently with respect to the inter-enterprise messages; and for ensuring peer-wise synchronization of conversation process executions. The results of the BPSS model based run-time verification are used to determine the correctness of document sending and receiving, and to generate the conditions for activating local process tasks to process inbound documents and provide outbound documents. Regarding to the interface to PM, the information returned from the BPSS collaboration verification operations is used to insert messages, portions of messages or information about messages into a task activation data structure that is used to activate the local process tasks asynchronously. The system manages collaboration sessions, including initiating and maintaining the global conversation instance and Id for each conversation process, and at a participant site, correlating the conversation Id with the local processes, tasks or actions that support the corresponding conversation process. The system manages collaboration roles. Under BPSS, this includes resolving, maintaining and retrieving the authorized-roles for binary collaboration, and partner-roles for multi-party collaborations. This allows a party to play different roles in multiple binary collaborations involved in a conversation process hierarchy or in a multi-party collaboration. And, the system monitors collaboration instances. A web interface may be provided for monitoring the collaboration status, documents exchanged, etc, with other partners.

The logical execution of a BPSS conversation process actually involves two or more peer-executions at the participant sites. At each site, a peer conversation process instance 314 is built and evolved step by step as the document exchanges go on. The history of the conversation is maintained as part of the instance. For business documents, either sent or received, the BPSS collaborator will search the conversation process template to identify the conversation activity, transaction, requesting operation or responding operation that match the delivered document; and locate, update or create the corresponding instances if they are consistent with the template. Unlike a business process instance that is evolved by the workflow engine, a conversation process instance is evolved as the reaction to document exchanges, so in most cases it is back-filled.

Figure 4:
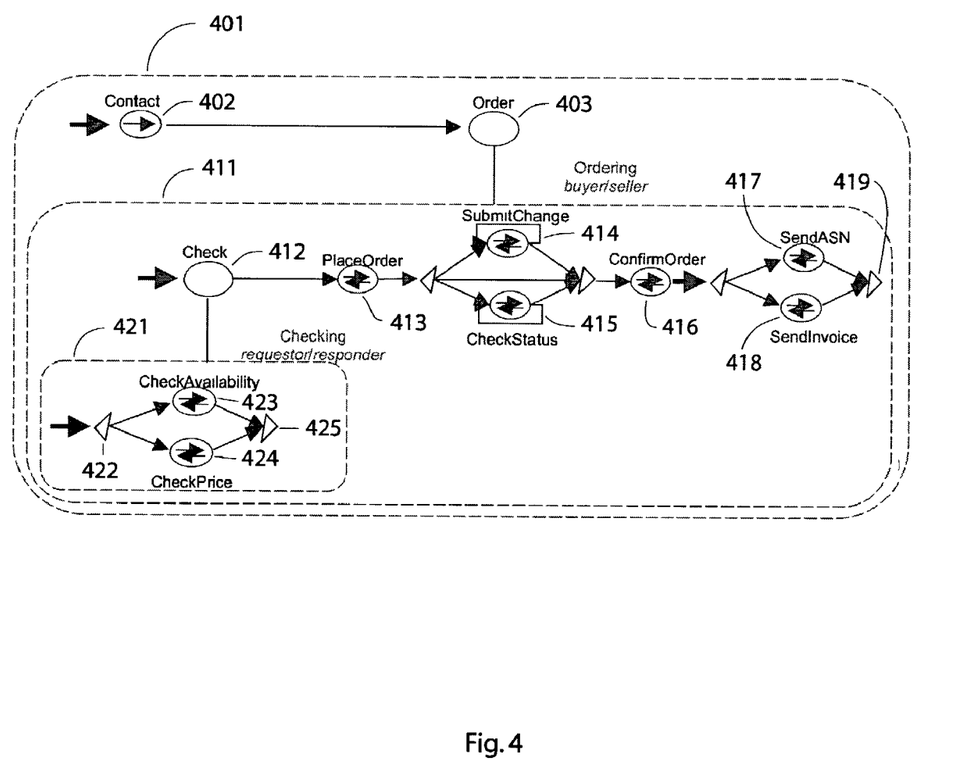
FIGS. 4 and 5 illustrate, with backfilling, processing of inter-enterprise conversation process messages by an order processing system.

FIG. 4 shows a conversation process example with two level nesting. Its instance is created and evolved according to document exchange. For verifying a document delivery, the collaborator takes conversation ID, document type, sender, receiver and activity name as input parameters, validates these information based on the conversation process template and instance, returns verification results to the local service such as a coupling workflow engine, and evolve the conversation process instance. In this example we can see three conversation processes at different levels: "OrderManagement" 401, "Ordering" 411 and "Checking" 421. "Order" 403 and "Check" 412 are collaboration activities representing nested conversation processes; other activities specify document flow between two roles. Activities "Submit Change" 414 and "Check Status" 415 can be repeated. These conversation processes are defined with different roles. Accordingly, a party will play different roles in the conversation process instances at different levels, and the role resolution and switching are the functions provided by the collaborator.

Figure 5A:
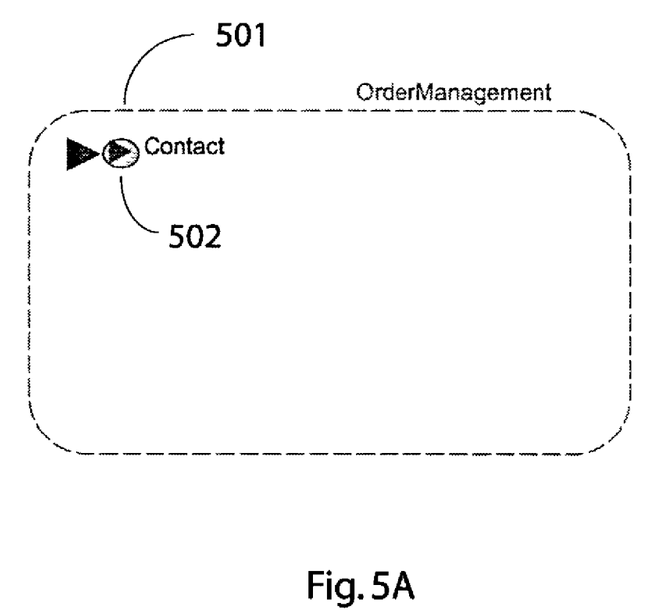
Figure 5B:
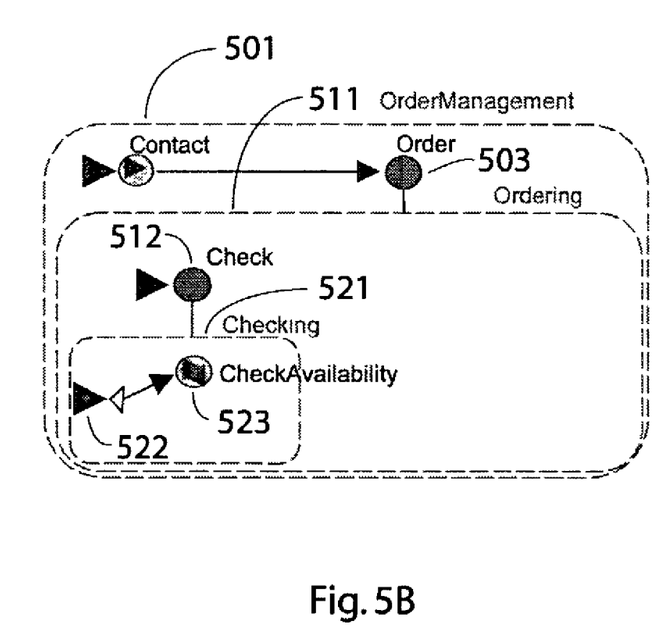

To show how a conversation process instance evolves in the way differently from how a business process instance evolves, we illustrate in FIGS. 5A-B the conversation instances upon the first two documents delivered. The first Order Management 501 document should be the requesting document for conversation activity "Contact" 502; this activity specifies one-way document delivery. When the document delivery is validated, the conversation process instance looks like FIG. 5A. The second Ordering 511 document should be the requesting document 512 of conversation activity "CheckAvailability" 523, and if validated, the conversation process instance is evolved to FIG. 5B. A response 522 is returned. We can see clearly how the containing conversation processes "Ordering" 511 and "Checking" 521 are instantiated to hold this conversation activity, in the "back filled" way.

Possible Architectures for Interacting CM and PM

While the BPSS collaborator handles conversation activities, document consumption and production are implemented as local business processes and services. As a CM system, the BPSS collaborator can interface to either a PM or an AM; and there are several configurations for a CM and PM to interact.

First, a stand-alone ICP engine can be constructed around the CM to support only conversation activities. The CPM built on this architecture has the following limitations. This architecture does not support processes involving the local tasks other than conversation activities; therefore it does not readily accommodate the usual case that an enterprise business process is defined for conducting both public interaction and private applications. It does not allow a public conversation process to interact with a running local process. Further, the local services invoked by the CPM as separate points of service (POSs), are not correlated at the business process level. This architecture has to deal with the scalability on its own as it cannot rely on a local workflow engine to do so. Therefore, it must be facilitated with a full spectrum of process management functions, with considerable overlap to an enterprise workflow engine.

Second, a workflow engine can have the CM as its front-end for handling business conversation. The major limitation of this architecture is that the BPSS collaborator has its own inter-enterprise messaging logic, and therefore must ensure the throughput, security, etc, of message delivery. In case the backend workflow engine includes this logic, the BPSS collaborator should be able to reuse it, which leads to the architecture described below.

Third, an extended workflow engine can have the CM plugged in. This last architecture increases usability of existing workflow system components, supports both conversation processes and local processes, and simplifies the interface between CM and PM. By providing CMs under different ICP standards, a CPM can support multiple ICP languages.

CM as Model-Driven Asynchronous Task Activator

Synchronous and Asynchronous Task Activation

In conventional workflow models, conceptually a task is triggered by the satisfaction of so-called "task activation conditions". When a process is specified with inter-linked tasks, a link from task Tp to task T actually represents an activation condition of T relating to the execution status of Tp. From this point of view, a business process may also be viewed as a set of rules for task activation, process termination, etc.

We distinguish two general mechanisms of task activation: synchronous activation and asynchronous activation. Given a task T, synchronous activation means an event, such as notifying the status of a precedent task, directly activates T. Asynchronous activation means an event causes the update of a task activation data structure underlying the task activation condition of T, which may potentially make the task ready to run. Checking conditions and activating T is handled by a separate, asynchronous thread of control. Activating a task may mean executing it right away or schedule it to run.

Conversation Model Driven Asynchronous Task Activation

Given a conversation process, C, and the coupling local business process, P, even if the task flow of P is consistent with the order of document exchange specified in C, it is difficult to synchronize the execution paces of P and C, especially when P involves other private applications and runs at a different pace from C.

Figure 6:
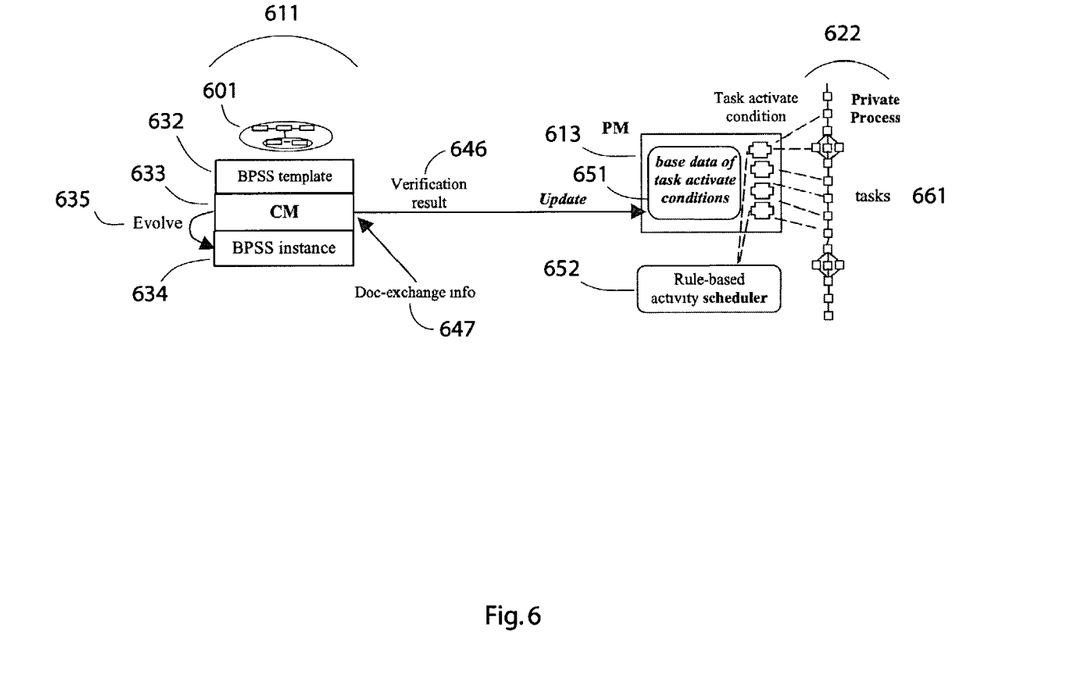
FIGS. 6 and 7 provide additional detail regarding interaction of a BPSS conversation manager and a process manager.

Asynchronous task activation is the mechanism for solving the difficulty of synchronizing a conversation process instance and the corresponding local business process instance. Referring to FIG. 6, asynchronous task activation may include the following. A task 661 can be scheduled to run based on certain task-activation conditions 651, and these conditions are checked against certain underlying data. The evolving 635 of a conversation process instance 634 upon document exchange 647 generates the information for updating 651 the task activation data structure underlying task activation-conditions. Asynchronously, the task scheduler 652 of a PM 613 will check those conditions 651 to schedule tasks 661, as a separate thread of control. The task activation data structure updates can be made by the CM using PM's API, or by the PM using CM's API.

Regarding to BPSS-based conversation, validation of documents sent and received, may involve the following attributes: collaboration ID; conversation-activity name that represents a service; sender; receiver; and document name.

Based on the template 632 and execution instance of the BPSS conversation process 634, when the above document exchange information is validated, information 646 may be returned; otherwise appropriate error messages may be returned. The returned information 646 includes: collaboration ID; conversation-activity; interaction-time; requesting player and its role; responding player and its role; document name; action-type ("responsing" or "requesting"); validation status.

Figure 7:
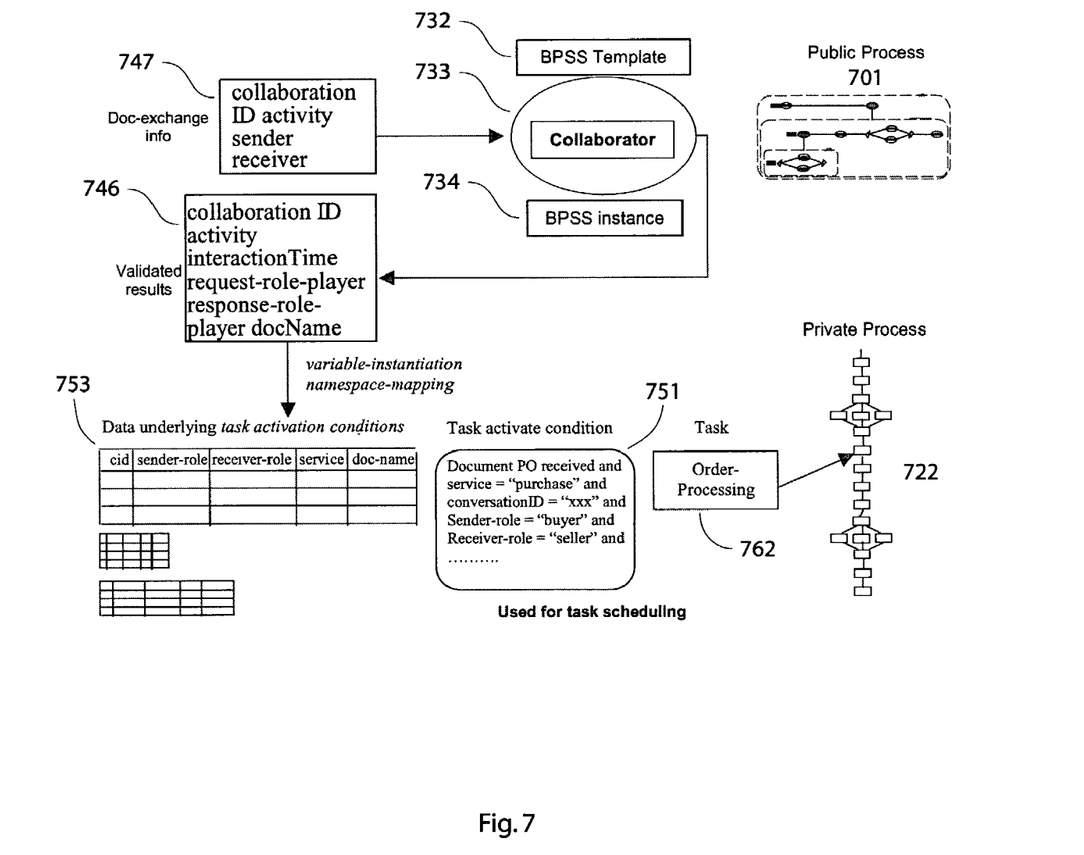

These resulting data may be selected to underlie task-activation conditions. A mapping between the information generated by CM and a task activation data structure is provided. Different mappings may adapt the CM to different workflow engines. With such mappings, conversation processes and local business processes can be defined independently. FIG. 7 is a more detailed illustration of the conversation model driven asynchronous task activation. Some numbering of this figure parallels the numbering in FIG. 6. In a public process 701, a document exchange message 747 is sent from one entity to another. This document exchange message 747 may include a collaboration ID, an activity, and identifications of the sender and receiver. The document exchange message is received for processing by a collaborator 733. The collaborator 733 has access to a BPSS template 732 that specifies rules or constraints on inter-enterprise conversation processing, preferably in the form of a schema. The collaborator 733 also has access to a BPSS instance 734 that includes a history of a particular conversation, typically tracked by collaboration ID number. The collaborator 733 verifies the message received, preferably against both the template 732 and a conversation history 734. The validated results 746 may include a collaboration ID, an activity, an interaction timestamp, a request-role party identification, a response-role party identification and a document name corresponding to the message. The message, a portion of the message or information responsive to the message is entered into a task activation data structure 753. The task activation data structure may include a collaboration ID, sender-role, receiver-role, service requested and document name. It may include various additional information used to activate tasks in an internal workflow. An additional data structure 751 includes task activation conditions. A workflow manager compares data in the task activation data structure to task activation conditions to determine when tasks, such as order processing 762 in a private process 722 should be activated, deactivated or otherwise processed.

Figure 8:
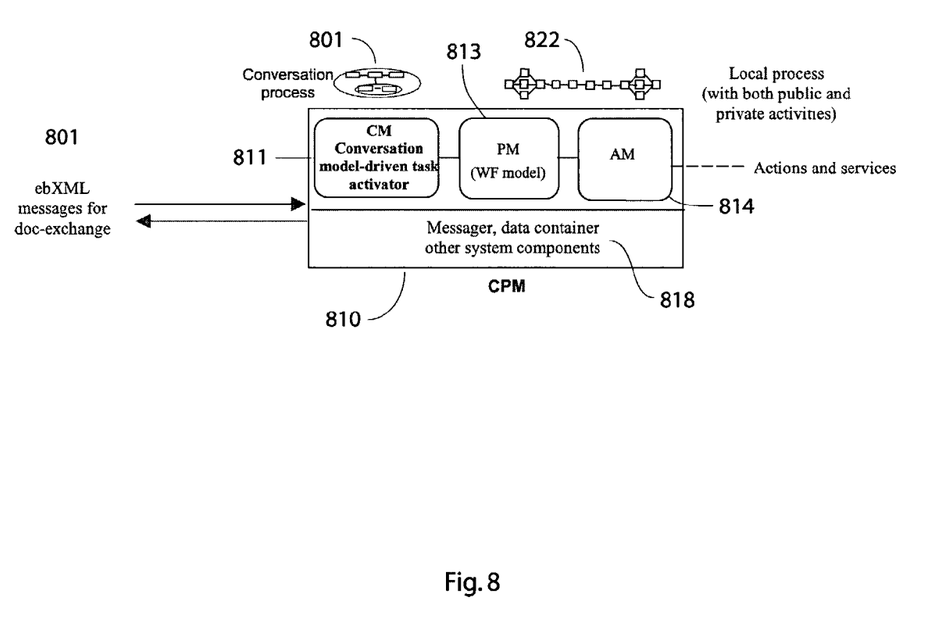
FIG. 8 illustrates one embodiment of tight coupling between conversation manager and a process manager.

With the above architecture, the functions of CM and PM have separate functions. As shown in FIG. 8, the CM 811 is responsible for managing conversations under a conversation process model 801, the PM 813 is responsible for managing the coupling of local processes 822 based on its workflow model. However, treating the BPSS collaborator as the CM built into the CPM 810 rather than as a front-end CM can free it from handling inter-enterprise messaging directly, allowing it to rely on the capability and scalability of the workflow engine logic 818 to do so. As shown in FIG. 8, in this case the CM does not act as a "message-interceptor". Tightly coupling a CM and a PM under the asynchronous task activation mechanism represents an elegant approach to bridging a conversation model 801 and a business process model 822. When the BPSS collaborator verifies document exchanges and uses the verification results to set up data for the task activation conditions for the local processes, the BPSS collaborator may be viewed as the extension of the PM's rule engine for task scheduling. And the conversation process instance may be viewed as the extension of the task activation data structure that is searched by the rule engine through APIs.

From this point of view, the BPSS collaborator can be characterized as a conversation model driven asynchronous task activator with which the rule based task scheduler interacts. This architecture modifies the CM function from an "active component" to a "passive component" controllable by the PM through APIs. This architecture supports the following features. It has a public interface. The BPSS collaborator provides BPSS model based conversation management. However, it does not intercept inter-enterprise messages; instead, it obtains the information on inter-enterprise interaction from the CPM platform. It has a local interface. The BPSS collaborator interfaces to the local PM through APIs, and can be characterized as a conversation model driven asynchronous task activator. It interacts with private processes. A conversation process instance can interact with a running local process under the asynchronous task activation mechanism; the local business process can have mixed tasks for handling interchanged documents and for other private actions.

A preferred architecture that uses a conversation manager as a plug-in to a workflow manager provides a clear separation of inter-enterprise conversation management and local business process management. It allows the maximal usability of existing workflow system components, supports both conversation processes and local processes and allows a conversation process to interact with a running local process. Based on the notion of conversation model driven asynchronous task activation, this architecture bridges the conversation model and the business process model, and supports seamless integration of CM and PM. Multiple CM-based conversation model driven asynchronous task activators under different ICP standards can be provided which allow the CPM to support multiple ICP languages.

As ICP standardization is ongoing, it is understood that multiple conversation managers or components of a single CM, based on several ICP models, such as BPSS, WSFL and WSCI, can support multiple inter-enterprise interaction standards.

In order for enterprises to collaborate at the business-process level, they must allow the business processes run on their local sites to interact. Each party participating in an inter-enterprise collaboration needs to deal with two kinds of processes: the public conversation process specifying the "conversation-flow", and the local business process specifying the "workflow" that fulfills the conversation activities. How to integrate conversation-flow management and workflow management, particularly, how to make full use of an existing workflow engine to support inter-enterprise collaboration, is a challenge.

Several architectures for interoperating a conversation manager and a process manager based on conversation model driven asynchronous task activation have been described that support extended use of existing workflow system components, support both conversation processes and local processes, and provide a dynamic and simple interface between conversation management and process management.

This work, addressing peer-to-peer process interaction, clearly differs from the centralized workflow management [Workflow Management Coalition, www.aiim.org/wfmc/mainframe.htm], from the conventional process inter-operation for enforcing ad-hoc task dependencies and data exchanges in a single enterprise, and from the process invocation based process decentralization seen in [M. Koetsier, P. Grefen, J. Vonk, "Contracts for Cross-Organizational Workflow Management", Proc. EC-Web'2000], etc. This work has also elevated the peer-to-peer interaction to the process level [Qiming Chen, Meichun Hsu, Umesh Dayal, Martin Griss, "Incorporating Multi-Agent Cooperation, Dynamic Workflow and XML for E-Commerce Automation", Proc. Fourth International Conference on Autonomous Agents, 2000, Span, Qiming Chen, Umesh Dayal, Meichun Hsu, Martin Griss, "Dynamic Agent, Workflow and XML for E-Commerce Automation", Proc. First International Conference on E-Commerce and Web-Technology, 2000, UK, Chweh CR, "Peer-to-peer computing transforms file-sharing and large-scale distributed computing, IEEE Software, Vol. 18, No. 1, 2001, and Clark D, "Face-to-face with peer-to-peer networking", Computer, Vol. 34, No. 1, 2001].

Different from WSDL [WSDL, "Web Service Description Language", www.w3c.org], WSFL [WSFL, "Web Service Flow Language", www-3.ibm.com/software/solutions/webservices/], Rosetta-net [WSCI, "Web Service Choreography Interface", Tech Report by Italio, SAP, BEA, Sun Microsystems. 2002], and BPML [BPML, "Business Process Markup Language", www.BPMI.org. 2002], that support point of conversation not directly correlated at the process-level, this work focuses on choreographed conversation. The standards body approach of dealing with points of conversation can provide certain flexibility, but can hardly follow a commonly agreed conversation model standard such as ebXML BPSS. Furthermore, WSFL, BPML and WSCL, etc, are used to offer a single party view rather than the public view, to the collaboration. As a result, an implementation does not present a general model of peer-to-peer synchronized execution; for instance, it does not intend to specify how the partner process instances are synchronized or are made aware of the progress of the peer processes.

It should be recognized that aspects of this invention integrate inter-enterprise collaborations with intra-enterprise business processes. This is a practical challenge faced by many organizations. Fundamental differences exist between conversation models that underlie the ICP standards and the conventional business process models that the existing workflow engines support. Most of the current efforts are characterized by adopting a model that either "simulates" conversation activities by the business process tasks, or takes local processes as "point of services" to "fulfill" conversation activities [BEA System, InTalio, SAP, Sun Microsystems, "Web Service Choreography Interface", 2002, BPML, "Business Process Markup Language", www.BPMI.org. 2002, WSFL, "web Service Flow Language", www-3.ibm.com/software/solutions/webservices/]. These efforts lack a formal execution mechanism for run-time interaction of the public conversation process and the local business process.

One embodiment of the present invention can be characterized as a method of coordinating choreographed exchange messages in an electronic commerce conversation between a first party and a second party. An internal workflow process is associated with the second party. The method includes the second party receiving a message. The message is intended to be part of a conversation conforming to an electronic commerce conversation process standard. The standard may be a public standard such as one of the standards identified above, or it may be a private standard. In addition, the conversation may conform to a private agreement between the parties. This agreement may be reached bilaterally, by participation in a group, or by any other mechanism. The message received is verified, preferably against the conversation process standard and against the history of the conversation, for instance, a history maintained as a conversation instance. In addition, when a private agreement exists between the parties, the message may be verified against the private agreement. Message exchanges that are part of a particular conversation instance may be coordinated by assignment of a collaboration ID. Processing of the message includes reporting the message, either the text of the message, a portion of the message or information responsive to the message, to a task activation data structure. This data structure is accessible to the conversation manager and is used by a workflow processor to satisfy one or more activation conditions. The activation conditions are compared asynchronously to contents of the data structure. A component associated with the workflow processor, such as a task or an action or the workflow processor itself, generates a workflow message which is received and used to prepare a response to the message. At one or more times following receipt of the message, the history of the conversation is updated.

Another embodiment of the present invention is a method of coordinating an electronic commerce conversation between enterprises, a workflow within one of the enterprises and one or more actions that are part of the workflow. This method includes processing a plurality of messages in a conversation between enterprises that is intended to comply with an electronic commerce conversation process standard. For at least one of the messages, the method includes posting information responsive to the message, such as the message, a portion of the message or information responsive to the message, from a conversation management process to a task activation data structure. The internal workflow engine, acting asynchronously from the conversation, uses the task activation data structure to activate one or more actions in the workflow when the posted information satisfies a task activation condition. In some instances, one or more messages are generated and sent to the conversation process, corresponding to the activated action. In this method, prior to posting information responsive to the message, the conversation manager may verify that the message conforms to the conversation process standard, the history of the conversation, a private agreement between the parties, or combination of these factors.

Computer-based conversation systems parallel to the methods described above provide additional embodiments of the present invention. One such embodiment includes at least one computer system, including resources to process logic. A task activation data structure is accessible through the computer system. Conversation manager logic is operable on computer system. The conversation manager logic processes a conversation with the trading partner, including messages, in conformance with an electronic commerce conversation process standard. In some cases, the conversation also may be in conformance with an agreement between trading partners. The conversation manager logic verifies that a particular message conforms to a history of a particular conversation, to the conversation process standard, to a private agreement, or combination of these factors. The conversation manager logic generates at least one entry in the task activation data structure corresponding to the particular message. This device further includes process manager logic operable on computer system and in communication with the conversation manager logic. The process manager logic manages triggering of tasks in an internal workflow. The internal workflow is not generally exposed to the trading partner. The process manager logic further accesses the task activation data structure to determine whether any task activation conditions have been satisfied. The device yet further includes action manager logic, operable on the computer system and in communication with the process manager logic, that dispatches and invokes actions in the internal workflow. In some variations on this embodiment, more than one of the logic components may be combined into a single program or routine, or may run on a single computer system. In two variations on this embodiment, message handling components may be shared among and utilized by different logic components or separate message handling components may function separately for the different logic components.

While the present invention is disclosed by reference to the preferred embodiments and examples detailed above, it is understood that these examples are intended in an illustrative rather than in a limiting sense. Computer-assisted processing is implicated in the described embodiments. Accordingly, the present invention may be embodied in methods for computer-assisted processing, systems including logic to implement the methods, media impressed with logic to carry out the methods, data streams impressed with logic to carry out the methods, or computer-accessible processing services. It is contemplated that modifications and combinations will readily occur to those skilled in the art, which modifications and combinations will be within the spirit of the invention and the scope of the following claims.

We claim as follows:

1. A method of coordinating a choreographed exchange of messages in an electronic commerce conversation between a first party and a second party with a workflow process associated with the second party, the method including:
   the second party receiving a message in the conversation, the conversation conforming to an electronic commerce conversation process standard;
   verifying that the message conforms to the conversation process standard and to a history of the conversation;
   reporting the message to a task activation data structure, wherein
      the data structure is shared with the workflow processor associated with the second party and
      the workflow processor uses the data structure to satisfy one or more activation conditions and to asynchronously activate tasks;
   receiving a workflow message and using the workflow message to prepare a response to the message; and
   updating the history of the conversation one or more times.

2. The method of claim 1, wherein the message in the conversation further conforms to a conversation process agreement between the first party and the second party.

3. The method of claim 1, wherein the workflow message is received by the second party from the workflow processor.

4. A computer implemented method of communicating status information between a choreographed electronic commerce conversation process and an asynchronously operating workflow process, including:
   posting at least one message from the conversation process to a task activation data structure accessible in memory, wherein the message is verified to conform to a history of the conversation and to an electronic commerce conversation standard;
   evaluating the posted message, asynchronously from the conversation process, as satisfying at least one task activation condition;
   activating at least one workflow task; and
   sending a workflow message from the workflow process to the conversation process corresponding to the activated workflow task.

5. A computer implemented method of coordinating an electronic commerce conversation between enterprises, a workflow within an enterprise and one or more actions within the workflow, the method including:
   processing a plurality of messages in the conversation between the enterprises in accordance with an electronic commerce conversation process standard;
   for at least one message, posting at least a portion of the message from a conversation management process to a task activation data structure;
   asynchronously from the conversation, using the data structure to track status of actions in workflow;
   activating at least one action in the workflow when the posted portion of the message satisfies a task activation condition;
   sending one or more messages to the conversation process corresponding to the activated action.

6. The method of claim 5, wherein, prior to the posting step, verifying that the message conforms to the conversation process standard and to a history of the conversation.

7. The method of claim 5, wherein the message further conforms to a conversation process agreement between the enterprises.

8. A computer-based conversation process driven asynchronous task activator, the device including:
   at least one computer system, including resources to process logic;
   a task activation data structure, accessible through the computer system;
   conversation manager logic, operable on the computer system, that
      processes a conversation with a trading partner, including messages, in conformance with an electronic commerce conversation process standard;
      verifies that a particular message conforms to a history of a particular conversation and conforms to the conversation process standard;
      generates at least one entry in the task activation data structure corresponding to the particular message;

process manager logic, operable on the computer system and in communication with the conversation manager logic, that     manages triggering of tasks in an internal workflow that is not generally exposed to the trading partner;

accesses the task activation data structure to determine whether any task activation conditions have been satisfied;

action manager logic, operable on the computer system and in communication with the process manager logic, that dispatches and invokes actions in the internal workflow.

9. The device of claim 8, further including shared message handling components accessible to and utilized by the conversation manager logic, the process manager logic and the action manager logic.

10. The device of claim 8, wherein the conversation manager logic utilizes first message handling components for external communications with the trading partner and the process manager logic and action manager logic use second message handling components for internal workflow communications with tasks and users.

* * * * *